(12) United States Patent
Xiong et al.

(10) Patent No.: US 10,989,063 B2
(45) Date of Patent: Apr. 27, 2021

(54) TURBOFAN GAS TURBINE ENGINE SHAFT BREAK DETECTION SYSTEM AND METHOD

(71) Applicant: HONEYWELL INTERNATIONAL INC., Morris Plains, NJ (US)

(72) Inventors: Yufei Xiong, Phoenix, AZ (US); Ronnie Haugland, Scottsdale, AZ (US); Scot Coffey, Mesa, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 853 days.

(21) Appl. No.: 15/237,834

(22) Filed: Aug. 16, 2016

(65) Prior Publication Data

US 2018/0051585 A1   Feb. 22, 2018

(51) Int. Cl.
| | | |
|---|---|---|
| *F01D 21/00* | (2006.01) | |
| *F01D 21/02* | (2006.01) | |
| *G01M 15/14* | (2006.01) | |
| *F01D 17/06* | (2006.01) | |
| *F01D 5/02* | (2006.01) | |
| *F04D 19/00* | (2006.01) | |
| *F02K 3/06* | (2006.01) | |

(52) U.S. Cl.
CPC ............. *F01D 21/003* (2013.01); *F01D 5/02* (2013.01); *F01D 21/02* (2013.01); *F04D 19/002* (2013.01); *G01M 15/14* (2013.01); *F01D 17/06* (2013.01); *F02K 3/06* (2013.01); *F05D 2200/12* (2013.01); *F05D 2200/221* (2013.01); *F05D 2240/60* (2013.01); *F05D 2260/80* (2013.01); *F05D 2270/09* (2013.01); *F05D 2270/304* (2013.01); *F05D 2270/52* (2013.01)

(58) Field of Classification Search
CPC ............................ F01D 21/003; G01M 15/14
USPC ....................................................... 73/112.01
See application file for complete search history.

(56) References Cited

U.S. PATENT DOCUMENTS

| | | | |
|---|---|---|---|
| 4,454,754 A | 6/1984 | Zagranski et al. | |
| 4,833,405 A | 5/1989 | Richards et al. | |
| 5,293,774 A | 3/1994 | Ratherham | |
| 5,303,545 A * | 4/1994 | Larkin ...................... | F02K 1/17 60/239 |
| 5,363,317 A | 11/1994 | Rice et al. | |

(Continued)

FOREIGN PATENT DOCUMENTS

JP        59093905        5/1984

OTHER PUBLICATIONS

Jeffrey Csank, Ryan D. May, Jonathan S. Litt, and Ten-Huei Guo, "Control Design for a Generic Commercial Aircraft Engine11", Oct. 2010, NASA TM-2010-216811.*

(Continued)

*Primary Examiner* — Eric S. McCall
*Assistant Examiner* — Timothy P Graves
(74) *Attorney, Agent, or Firm* — Lorenz & Kopf, LLP

(57) ABSTRACT

A system and method for detecting a shaft break in a turbofan gas turbine engine includes sensing fan rotational speed and sensing turbine engine rotational speed. A rate of change of rotational speed difference between the sensed fan rotational speed and the sensed turbine engine rotational speed is determined in a processor, and a determination that a shaft break has occurred is made in the processor based at least in part on the rate of change of the rotational speed difference.

20 Claims, 8 Drawing Sheets

(56) References Cited

U.S. PATENT DOCUMENTS

| | | | |
|---|---|---|---|
| 5,622,045 | A | 4/1997 | Weimer et al. |
| 6,176,074 | B1 | 1/2001 | Thompson et al. |
| 6,494,046 | B1 * | 12/2002 | Hayess .................. F01D 21/00 60/39.091 |
| 6,607,349 | B2 | 8/2003 | Mulera et al. |
| 6,881,024 | B2 | 4/2005 | Binetruy et al. |
| 7,735,310 | B2 | 6/2010 | Metscher |
| 8,172,509 | B2 | 5/2012 | Bart et al. |
| 8,825,342 | B2 | 9/2014 | Schaeffer et al. |
| 8,954,228 | B2 | 2/2015 | Falkmann et al. |
| 2013/0152600 | A1 | 6/2013 | Rowe |
| 2013/0312423 | A1 | 11/2013 | Bacic et al. |
| 2013/0319092 | A1 * | 12/2013 | Rowe .................. F01D 21/003 73/112.01 |
| 2015/0292348 | A1 | 10/2015 | Pasquier et al. |

OTHER PUBLICATIONS

Extended EP Search Report for Application No. 17184140.6-1006 dated Jan. 29, 2018.

* cited by examiner

TURBOFAN GAS TURBINE ENGINE SHAFT BREAK DETECTION SYSTEM AND METHOD

TECHNICAL FIELD

The present invention generally relates to gas turbine engines, and more particularly relates to systems and methods for detecting a shaft break in a turbofan gas turbine engine.

BACKGROUND

Although highly unlikely, it is postulated that the shaft connected to the fan of a turbofan gas turbine engine could break. For turbofan gas turbine engines, the control system controls the fan speed to match the speed set point by adjusting the fuel flow. Thus, in the highly unlikely, yet postulated event that the shaft connected to the fan were to break, a turbine overspeed condition could occur. This is because the fan would no longer load the corresponding turbine and, because the broken shaft would decouple the fan from the turbine, the rotational speed of the turbine would rapidly increase.

As may be appreciated, a turbine overspeed can have deleterious effects. Thus, most turbofan engines include shaft break detection systems. Unfortunately, many presently known shaft break detection systems can be relatively unreliable, and relatively expensive.

Hence, there is a need for a system and method for detecting a shaft break in a turbofan gas turbine engine that is relatively reliable and relatively inexpensive. The present invention addresses at least this need.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a method for detecting a shaft break in a turbofan gas turbine engine that includes at least a fan and a turbine, includes the steps of sensing fan rotational speed and sensing turbine engine rotational speed. A rate of change of rotational speed difference between the sensed fan rotational speed and the sensed turbine engine rotational speed is determined in a processor, and a determination that a shaft break has occurred is made in the processor based at least in part on the rate of change of the rotational speed difference.

In another embodiment, a turbofan gas turbine engine shaft break detection system for a turbofan engine includes a fan rotational speed sensor, a turbine engine rotational speed sensor, and a processor. The fan rotational speed sensor is configured to sense fan rotational speed and supply a fan rotational speed signal representative thereof. The turbine engine rotational engine speed sensor is configured to sense turbine engine rotational speed and supply a turbine engine rotational speed signal representative thereof. The processor is coupled to receive the fan rotational speed signal and the turbine engine rotational speed signal and is configured, upon receipt thereof, to: determine a rate of change of rotational speed difference between the sensed fan rotational speed and the sensed turbine engine rotational speed, and determine that a shaft break has occurred based at least in part on the rate of change of the rotational speed difference.

Furthermore, other desirable features and characteristics of the turbofan gas turbine engine shaft break detections system and method will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

In view of the foregoing, although one embodiment described herein is directed toward a dual-spool gas turbine engine for use in an aircraft, it will be appreciated that the described embodiments could be implemented in other types of gas turbine engines, including any one of numerous single-spool gas turbine engines and any one of numerous multi-spool gas turbine engines, and may also be used in various other vehicles and end-use environments.

Figure 1:
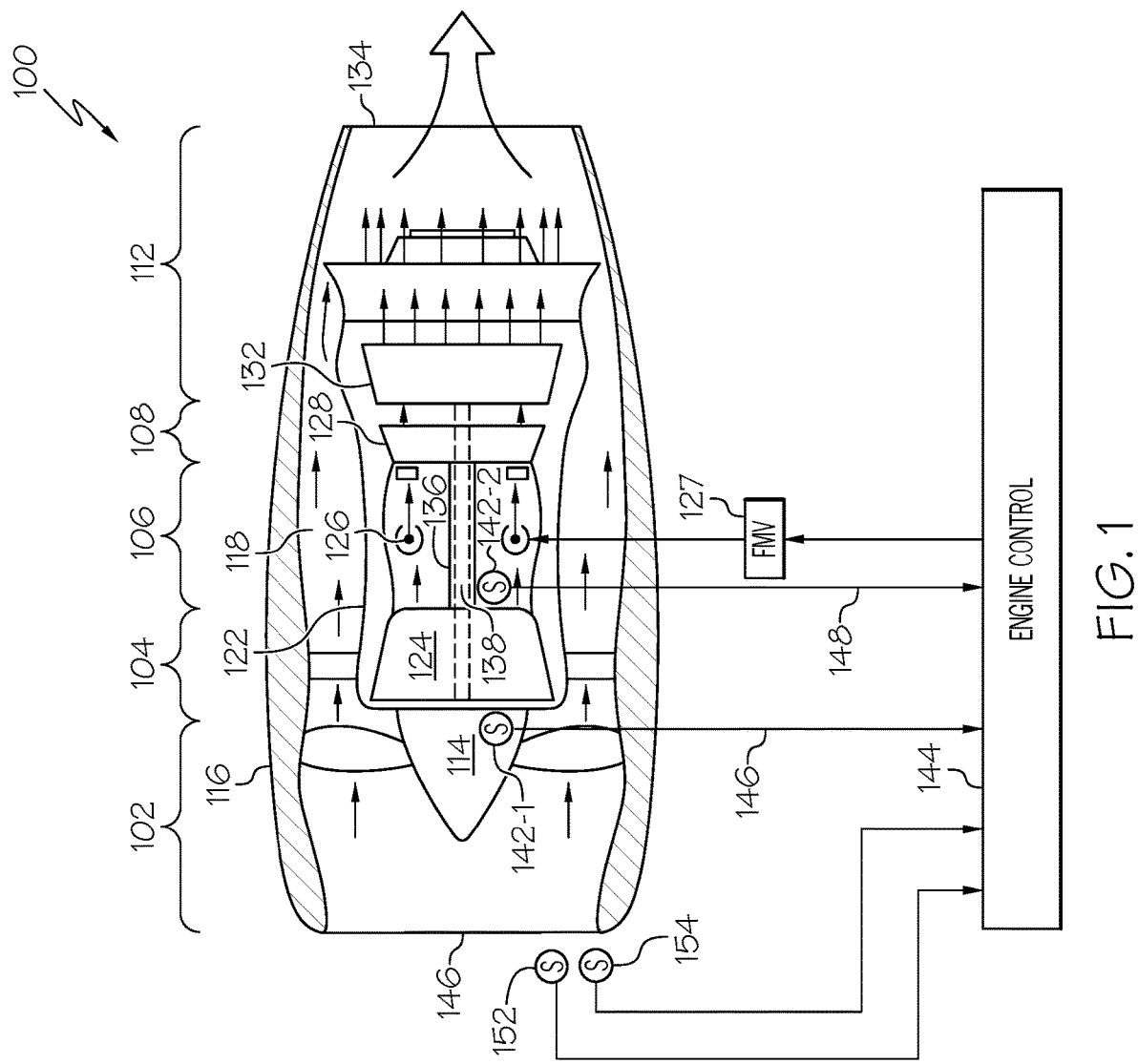
FIG. 1 depicts a functional block diagram of an exemplary gas turbine engine control system.

Turning now to FIG. 1, a functional block diagram of an exemplary gas turbine engine control system is depicted. The depicted system is for a multi-spool turbofan gas turbine engine 100, which includes an intake section 102, a compressor section 104, a combustion section 106, a turbine section 108, and an exhaust section 112. The intake section 102 includes a fan 114, which is mounted in a fan case 116. The fan 114 draws air into the intake section 102 and accelerates it. A fraction of the accelerated air exhausted from the fan 114 is directed through a bypass section 118 disposed between the fan case 116 and an engine cowl 122, and provides a forward thrust. The remaining fraction of air exhausted from the fan 114 is directed into the compressor section 104.

The compressor section 104 may include one or more compressors 124, which raise the pressure of the air directed into it from the fan 114, and directs the compressed air into the combustion section 106. In the depicted embodiment, only a single compressor 124 is shown, though it will be appreciated that one or more additional compressors could be used. In the combustion section 106, which includes a combustor assembly 126, the compressed air is mixed with fuel that is controllably supplied to the combustor assembly 126 from a non-illustrated fuel source via a fuel metering valve 127. The fuel and air mixture is combusted, and the high energy combusted air mixture is then directed into the turbine section 108.

The turbine section 108 includes one or more turbines. In the depicted embodiment, the turbine section 108 includes two turbines, a high pressure turbine 128, and a low pressure turbine 132. However, it will be appreciated that the engine 100 could be configured with more or less than this number of turbines. No matter the particular number, the combusted air mixture from the combustion section 106 expands through each turbine 128, 132, causing it to rotate. The combusted air mixture is then exhausted through an exhaust nozzle 134 disposed in the exhaust section 112, providing additional forward thrust. As the turbines 128 and 132 rotate, each drives equipment in the engine 100 via concentrically disposed shafts or spools. Specifically, the high pressure turbine 128 drives the compressor 124 via a high pressure spool 136, and the low pressure turbine 132 drives the fan 114 via a low pressure spool 138.

The depicted engine 100 additionally includes a plurality of sensors 142 and an engine control 144. The sensors 142, which are configured to supply data representative of various parameters associated with turbofan gas turbine engine operability, may vary in type and number. In the depicted embodiment, the sensors include at least a fan rotational speed sensor 142-1 and a turbine engine rotational engine speed sensor 142-2. The fan rotational speed sensor 142-1 is configured to sense fan rotational speed (N1), and more specifically low pressure spool rotational speed, and supply a fan rotational speed signal 146 representative thereof to the engine control 144. The turbine engine rotational engine speed sensor 142-2 is configured to sense turbine engine rotational speed (N2), and more specifically high pressure spool rotational speed, and supply a turbine engine rotational speed signal 148 representative thereof to the engine control 144. It will be appreciated that the engine 100 likely includes additional sensors. Some non-limiting examples of these additional sensors include fuel flow, fuel metering valve data, and various engine temperatures and pressures, just to name a few. These additional sensors are not needed to enable the claimed invention and are therefore not depicted or further described. It will additionally be appreciated that more speed sensors may be used in engines that include more spools (e.g., a three-spool configuration).

The engine control 144, which may be implemented using, for example, one or more processors 146, is coupled to receive signals from various ones of the sensors 142 and data from various other non-depicted data sources. The engine control 144 is configured, upon receipt of these signals and data, to control the operation of the turbofan gas turbine engine 100. In particular, and as is generally known, for turbofan gas turbine engines, such as the one depicted in FIG. 1, the control of engine thrust is realized through control of the engine fan speed (N1). As is also generally known, the fan speed set point (N1_DMD) is scheduled based on the aircraft throttle command data and various engine or avionics parameters such as, for example, Mach number, altitude, and ambient temperature. The engine control 144, in response to these inputs, controls the actual fan speed (N1) to match the fan speed set point (N1_DMD) by adjusting the fuel flow via, for example, the fuel metering valve 127.

In addition to controlling engine thrust, the engine control 144 is further configured to determine if a shaft break has occurred. More specifically, the engine control 144 is configured, upon receipt of the fan rotational speed signal 146 and the turbine engine rotational speed signal 148, to determine if a shaft break has occurred. The manner in which the engine control 144 determines that a shaft break has occurred may also vary. One particular process is depicted in flowchart form in FIG. 2, and with reference thereto will now be described.

Figure 2:
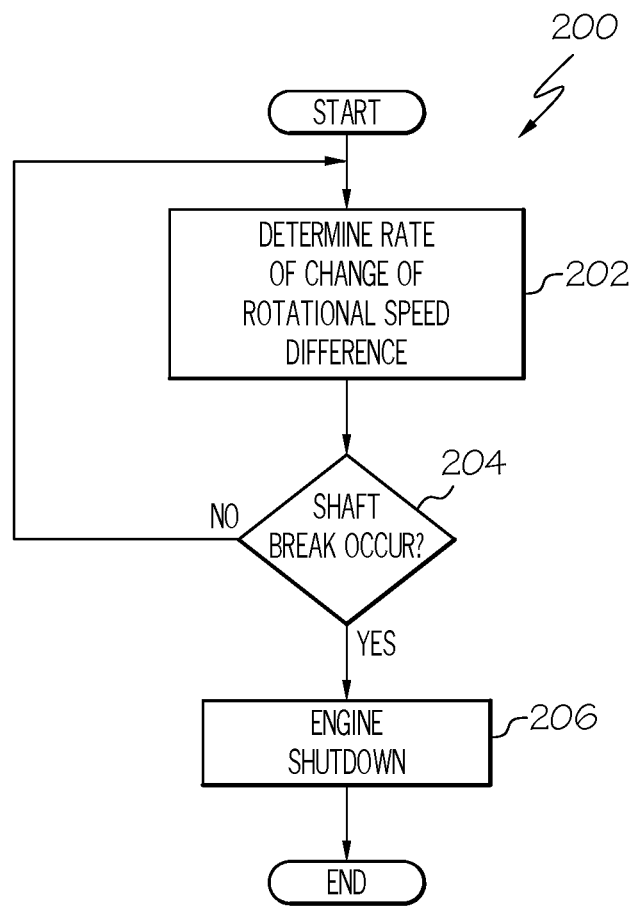
FIG. 2 depicts one embodiment of a generalized process, in flowchart form, for detecting a shaft break in a turbofan gas turbine engine, such as the one depicted in FIG. 1.

As depicted in FIG. 2, the engine control 144, upon initiation of the process 200, processes the fan rotational speed signal 146 and the turbine engine rotational speed signal 148 to determine the rate of change of the rotational speed difference between the sensed fan rotational speed and the sensed turbine engine rotational speed (202). The determined rate of change of the rotational speed difference is then used to determine whether a shaft break has occurred (204). If it is determined that a shaft break has occurred, then the engine 100 is shutdown and an alert may also be generated (206). If not, then the process 200 repeats. The manner in which the rate of change of the rotational speed difference is determined may vary, as may the manner in which the determination is made as to whether a shaft break has occurred. Some examples of how these determinations are made are described further below.

It will be appreciated that the general process 200 described above and depicted in FIG. 2 may be variously implemented. It will additionally be appreciated that the processor 146 in the engine control 144 may be configured to implement numerous and varied functional logic for carrying out the various implementations of the generalized process 200. Some example embodiments of the functional logic that the processor 146 may implement are depicted in FIGS. 3-8, and will now be described, beginning with FIG. 3.

Figure 3:
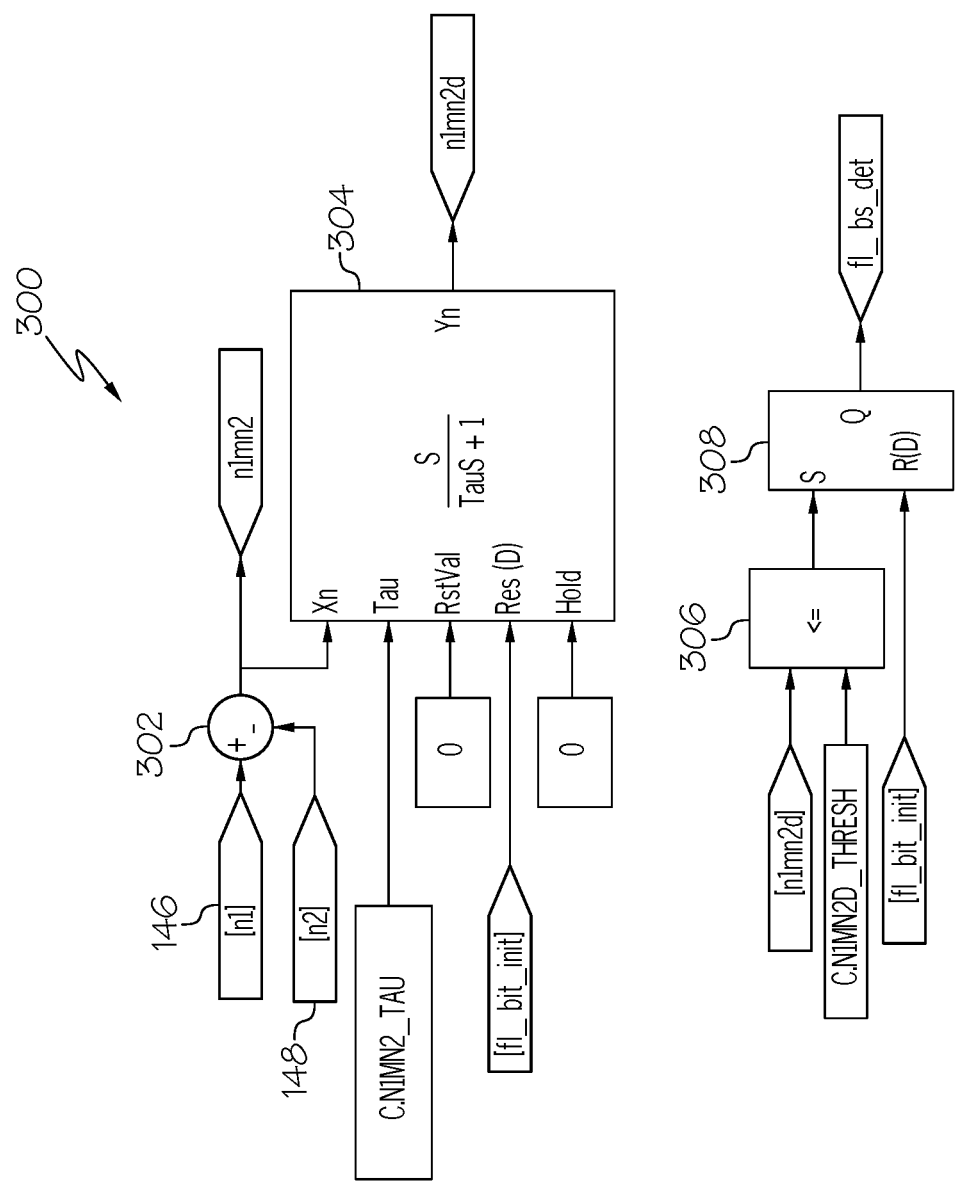
FIGS. 3-8 depict various example embodiments of functional logic that may be implemented in a processor for carrying out the generalized process depicted in FIG. 2.

The functional logic 300 depicted in FIG. 3 includes a difference function 302, a derivative function 304, and a comparator 306. The difference function 302 subtracts the sensed turbine engine rotational speed (n2) 148 from the sensed fan rotational speed (n1) 146 to determine a rotational speed difference (n1*mn*2). The rotational speed difference (n1*mn*2) is supplied to the derivative function 304, which is implemented using a first order high-pass filter, to output the rate of change of the input. In this case, the rate of change of the rotational speed difference (n1*mn*2*d*). The derivative function 304 also smooths the rate of change for robust detection. The derivative function 304 implements a time-constant (Tau) that may be set to a predetermined value (C.N1MN2_TAU). Although this value may vary, in one particular embodiment, a value of 0.01 seconds is used. It will be appreciated that this value may be varied as needed or desired.

The rate of change of the rotational speed difference (n1*mn*2*d*) that is output by the derivative function 304 is supplied to the comparator 306, which compares this value to a pre-determined threshold value (C.N1MN2D_THRESH). If rate of change of the rotational speed difference (n1*mn*2*d*) is less than or equal to the predetermined threshold value (C.N1MN2D_THRESH), then it is determined that a broken shaft has occurred. As a result, a logical-1 is supplied to the S-input of a SET-RESET logic function 308, which in turn outputs a logical-1 to indicate that the engine 100 should be shutdown. The threshold value (C.N1MN2D_THRESH) may vary, and may be set to a desired value. In one particular embodiment a value of −150%/second is used. It will be appreciated that this value may also be varied as needed or desired.

Figure 4:
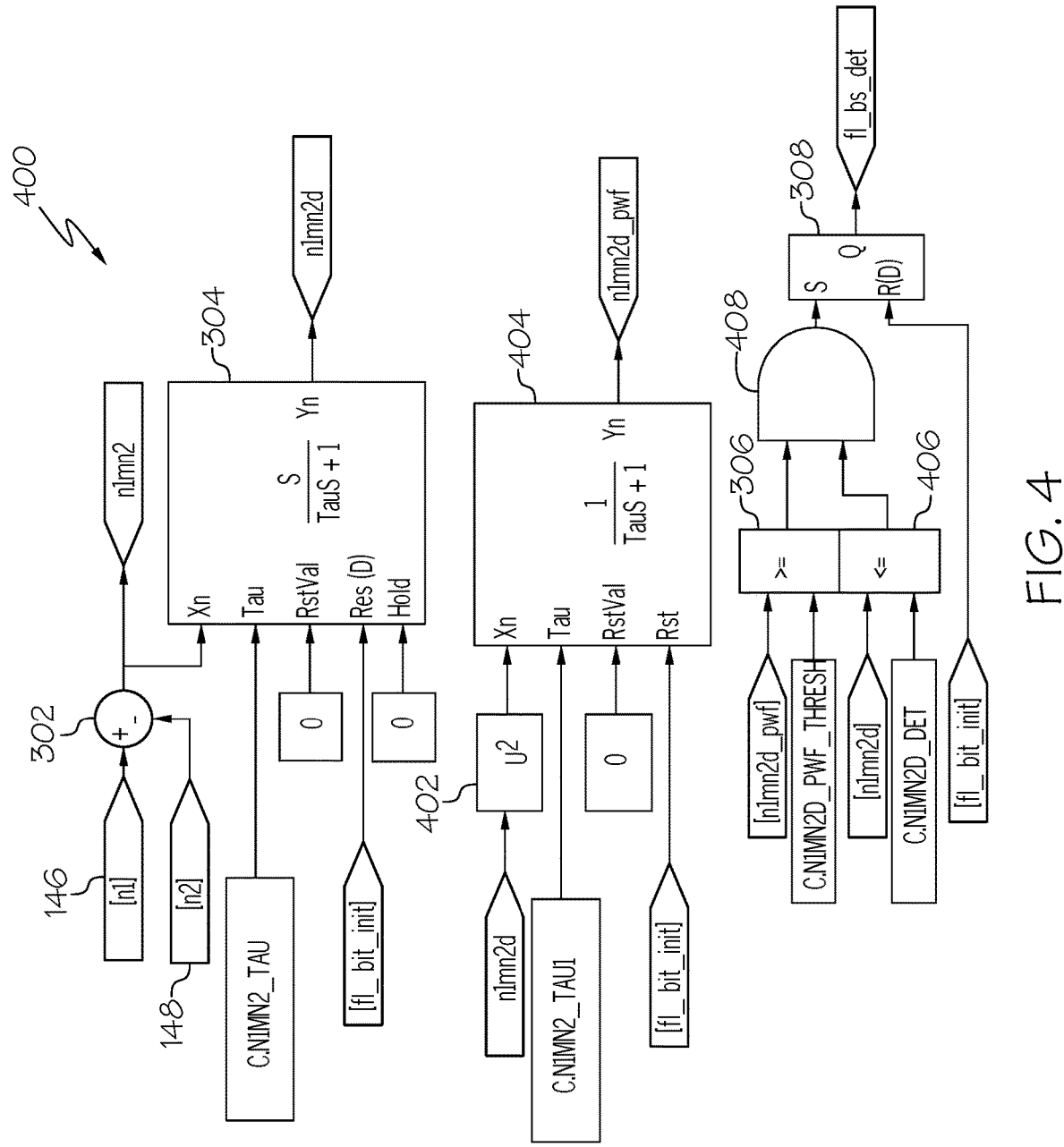

Turning now to FIG. 4, another embodiment of the functional logic that the processor 146 may implement is depicted. This functional logic 400 includes the same functions as the previously described functional logic 300, but additionally includes a squaring function 402 a first-order lag filter 404, a second comparator 406, and AND-logic 408. With this functional logic 400, the rate of change of rotational speed difference (n1$mn$2$d$) is supplied to the squaring function 402, which calculates the square of the rate of change of rotational speed difference, and supplies this value to the first-order lag filter 404.

The second first-order lag filter 404 filters the square of the rate of change of rotational speed difference to provide a squared and filtered rate of change (n1$mn$2$d\_pwf$). The first-order lag filter 404 also smooths the squired rate of change for robust detection, and also implements a time-constant (Tau) that may be set to a predetermined value (C.N1MN2_TAU1). Although this value may vary, in one particular embodiment, a value of 0.01 seconds is used. It will be appreciated that this value may be varied as needed or desired.

The value (n1$mn$2$d\_pwf$) output by the first-order lag filter 404 is compared, by the comparator 306, to a predetermined threshold value (C.N1MN2D_PWF_THRESH). If the squared and filtered rate of change (n1$mn$2$d\_pwf$) is greater than or equal to the predetermined threshold value (C.N1MN2D_PWF_THRESH), and the rate of change of the rotational speed difference (n1$mn$2$d$) is negative (e.g., less than a predetermined negative threshold value (C.N1MN2D_DET), then it is determined that a shaft break has occurred. As a result, a logical-1 is supplied to the S-input of the SET-RESET logic function 308, which in turn outputs a logical-1 to indicate that the engine 100 should be shutdown. The predetermined threshold value (C.N1MN2D_PWF_THRESH) and the predetermined negative threshold value (C.N1MN2D_DET) may vary, and may be set to desired values. In one particular embodiment a value of 20,000%$^2$/second$^2$ is used for the predetermined threshold value (C.N1MN2D_PWF_THRESH) and a value of −20%/second is used for the predetermined negative threshold value (C.N1MN2D_DET). It will be appreciated that these values may also be varied as needed or desired.

Figure 5:
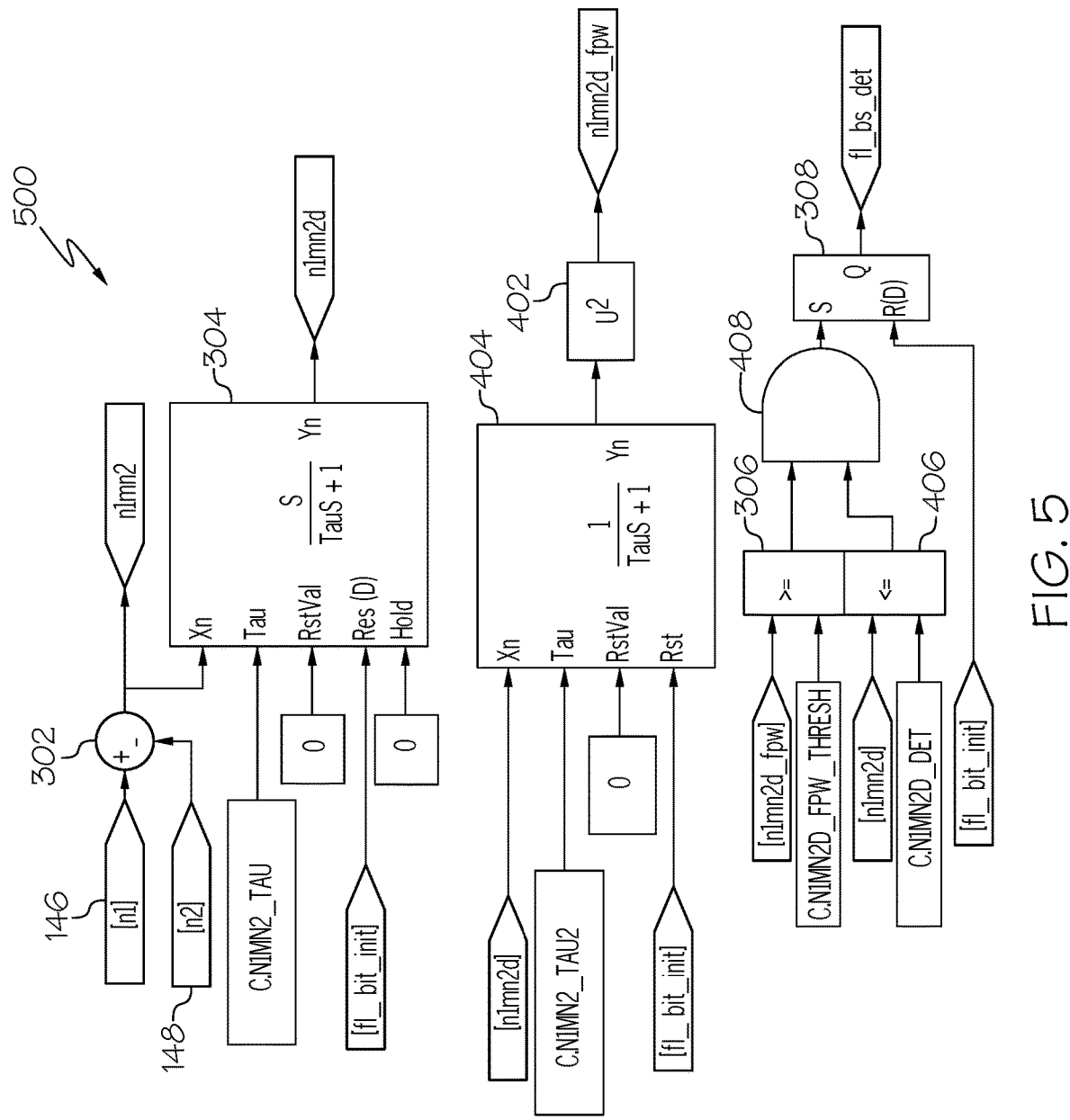

Another embodiment of the functional logic that the processor 146 may implement is depicted in FIG. 5. This functional logic 500 includes the same functions as the previously described functional logic 400; however, instead of first calculating the square of the rate of change of rotational speed difference (n1$mn$2$d$) and then filtering this value, the rate of change of rotational speed difference (n1$mn$2$d$) is first filtered by the first-order lag filter 404 to provide a filtered rate of change. This value is then supplied to the squaring function 402, which calculates a square of the filtered rate of change to provide a filtered and squared rate of change (n1$mn$2$d\_fpw$).

The value (n1$mn$2$d\_fpw$) output by the squaring function 402 is compared, by the comparator 306, to a predetermined threshold value (C.N1MN2D_FPW_THRESH). If the filtered and squared rate of change (n1$mn$2$d\_fpw$) is greater than or equal to the predetermined threshold value (C.N1MN2D_FPW_THRESH), and the rate of change of the rotational speed difference (n1$mn$2$d$) is negative (e.g., less than the predetermined negative threshold value (C.N1MN2D_DET), then it is determined that a shaft break has occurred. As a result, a logical-1 is supplied to the S-input of the SET-RESET logic function 308, which in turn outputs a logical-1 to indicate that the engine 100 should be shutdown. The predetermined threshold value (C.N1MN2D_FPW_THRESH) and the predetermined negative threshold value (C.N1MN2D_DET) may vary, and may be set to desired values. In one particular embodiment a value of 15,000%$^2$/second$^2$ is used for the predetermined threshold value (C.N1MN2D_FPW_THRESH) and a value of −20%/second is used for the predetermined negative threshold value (C.N1MN2D_DET). It will be appreciated that these values may also be varied as needed or desired.

Figure 6:
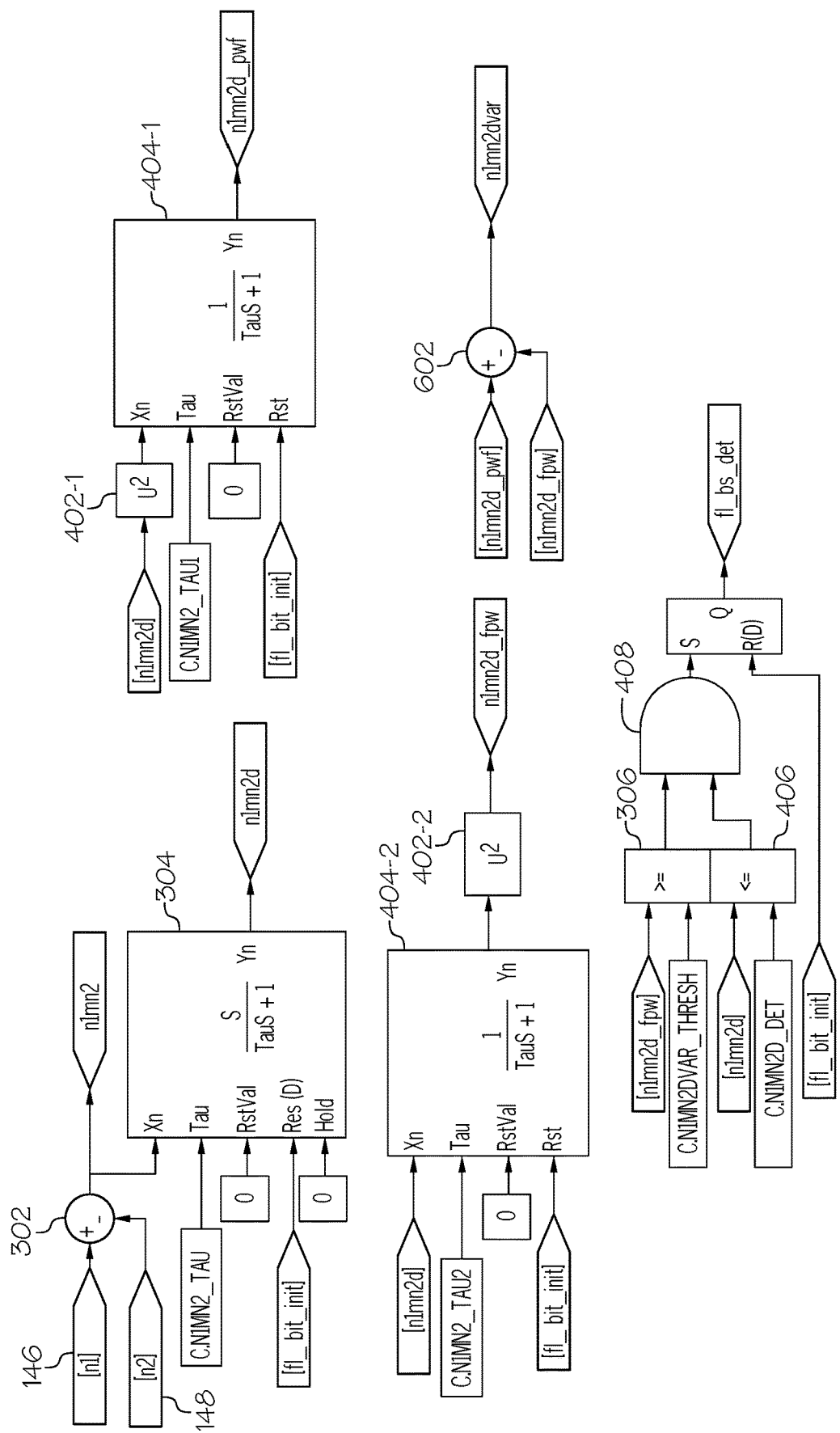

The functional logic 600 depicted in FIG. 6 implements a combination of the functional logics 400, 500 depicted in FIGS. 4 and 5, and thus includes first and second squaring functions 402-1, 402-2, first and second first-order lag filters 404-1, 404-2, and a second difference function 602. With this functional logic 600, the square of the rate of change of rotational speed difference (n1$mn$2$d$) is calculated using the first squaring function 402-1, and is then filtered through the first first-order lag filter 404-1 to provide the squared and filtered rate of change (n1$mn$2$d\_pwf$). In addition, the rate of change of rotational speed difference (n1$mn$2$d$) is filtered by the second first-order lag filter 404-2 to provide a filtered rate of change. This value is then supplied to the second squaring function 402-2, which calculates the square of the filtered rate of change to provide the filtered and squared rate of change (n1$mn$2$d\_fpw$).

The squared and filtered rate of change (n1$mn$2$d\_pwf$) and the filtered and squared rate of change (n1$mn$2$d\_fpw$) are both supplied to the second difference function 602. The second difference function 602 subtracts the filtered and squared rate of change (n1$mn$2$d\_fpw$) from the squared and filtered rate of change (n1$mn$2$d\_pwf$) to provide what is referred to herein as a variance value (n1$mn$2$dvar$). The variance value (n1$mn$2$dvar$) is compared, by the comparator 306, to a predetermined threshold value (C.N1MN2DVAR_THRESH). If the variance value (n1$mn$2$dvar$) is greater than or equal to the predetermined threshold value (C.N1MN2DVAR_THRESH), and the rate of change of the rotational speed difference (n1$mn$2$d$) is negative (e.g., less than the predetermined negative threshold value (C.N1MN2D_DET), then it is determined that a shaft break has occurred. As a result, a logical-1 is supplied to the S-input of the SET-RESET logic function 308, which in turn outputs a logical-1 to indicate that the engine 100 should be shutdown. The predetermined threshold value (C.N1MN2DVAR_THRESH) and the predetermined negative threshold value (C.N1MN2D_DET) may vary, and may be set to desired values. In one particular embodiment a value of 2,000%$^2$/second$^2$ is used for the predetermined threshold value (C.N1MN2DVAR_THRESH) and a value of −20%/second is used for the predetermined negative threshold value (C.N1MN2D_DET). It will be appreciated that these values may also be varied as needed or desired.

Before proceeding further, it is noted that the functional logics 300-500 depicted in FIGS. 3-5 and described above are all configured to first determine the difference between the sensed fan rotational speed 146 and the sensed turbine engine rotational speed 148, and then determine the rate of change of the rotational speed difference. It will be appreciated, however, that the rate of change of the rotational speed difference may instead be determined by first determining the rate of change of the sensed fan rotational speed and rate of change of the sensed turbine engine rotational speed, and then determining the difference between the rate of change of the sensed fan rotational speed and the rate of change of the sensed turbine engine rotational speed. An example of this configuration is depicted in FIG. 7, and with reference thereto will now be described.

Figure 7:
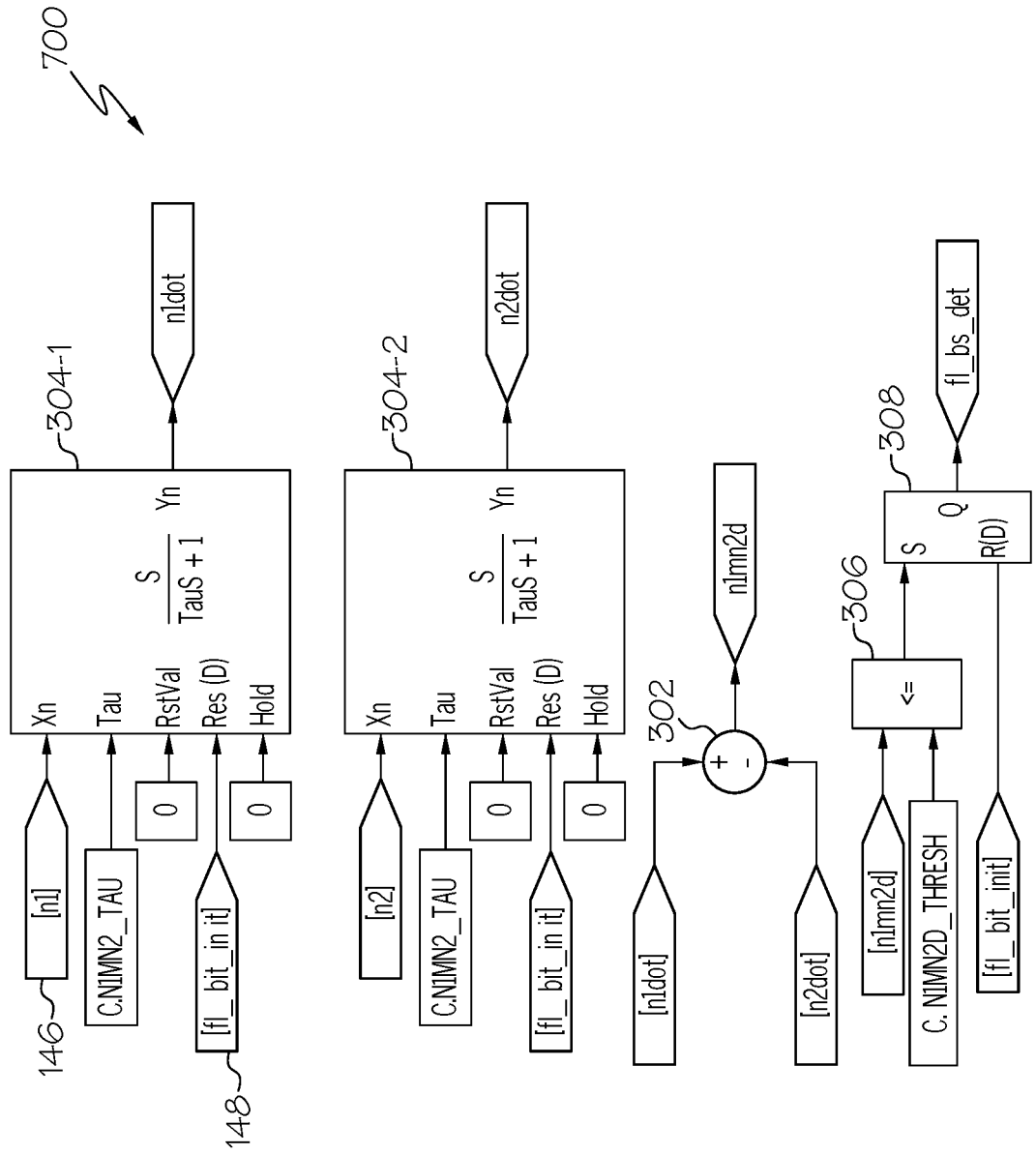

The functional logic 700 depicted in FIG. 7 includes the difference function 302, first and second derivative functions 304-1, 304-2, and the comparator 306. With this functional logic 700, however, the fan rotational speed is supplied to the first derivative function 304-1, and the turbine engine rotational speed is supplied to the second derivative function 304-2. The first derivative function 304-1 determines the fan rotational speed rate of change (n1*dot*), and the second derivative function 304-2 determines the turbine engine rotational speed rate of change (n2*dot*). The first and second derivative functions 304-1, 304-2 also smooth the rate of changes for robust detection, and each implements a time-constant (Tau) that may be set to predetermined values (C.N1MN2_TAU). Although this value may vary, in one particular embodiment, a value of 0.01 seconds is used. It will be appreciated that this value may be varied as needed or desired.

The difference function 302 then subtracts the turbine engine rotational speed rate of change (n2*dot*) from the fan rotational speed rate of change (n1*dot*) to determine the rate of change of the rotational speed difference (n1*mn2d*). The rate of change of the rotational speed difference (n1*mn2d*) is supplied to the comparator 306, which compares this value to a pre-determined threshold value (C.N1MN2D_THRESH). If rate of change of the rotational speed difference (n1*mn2d*) is less than or equal to the predetermined threshold value (C.N1MN2D_THRESH), then it is determined that a broken shaft has occurred. As a result, a logical-1 is supplied to the S-input of a SET-RESET logic function 308, which in turn outputs a logical-1 to indicate that the engine 100 should be shutdown. The threshold value (C.N1MN2D_THRESH) may vary, and may be set to a desired value. In one particular embodiment a value of −150%/second is used. It will be appreciated that this value may also be varied as needed or desired.

Figure 8:
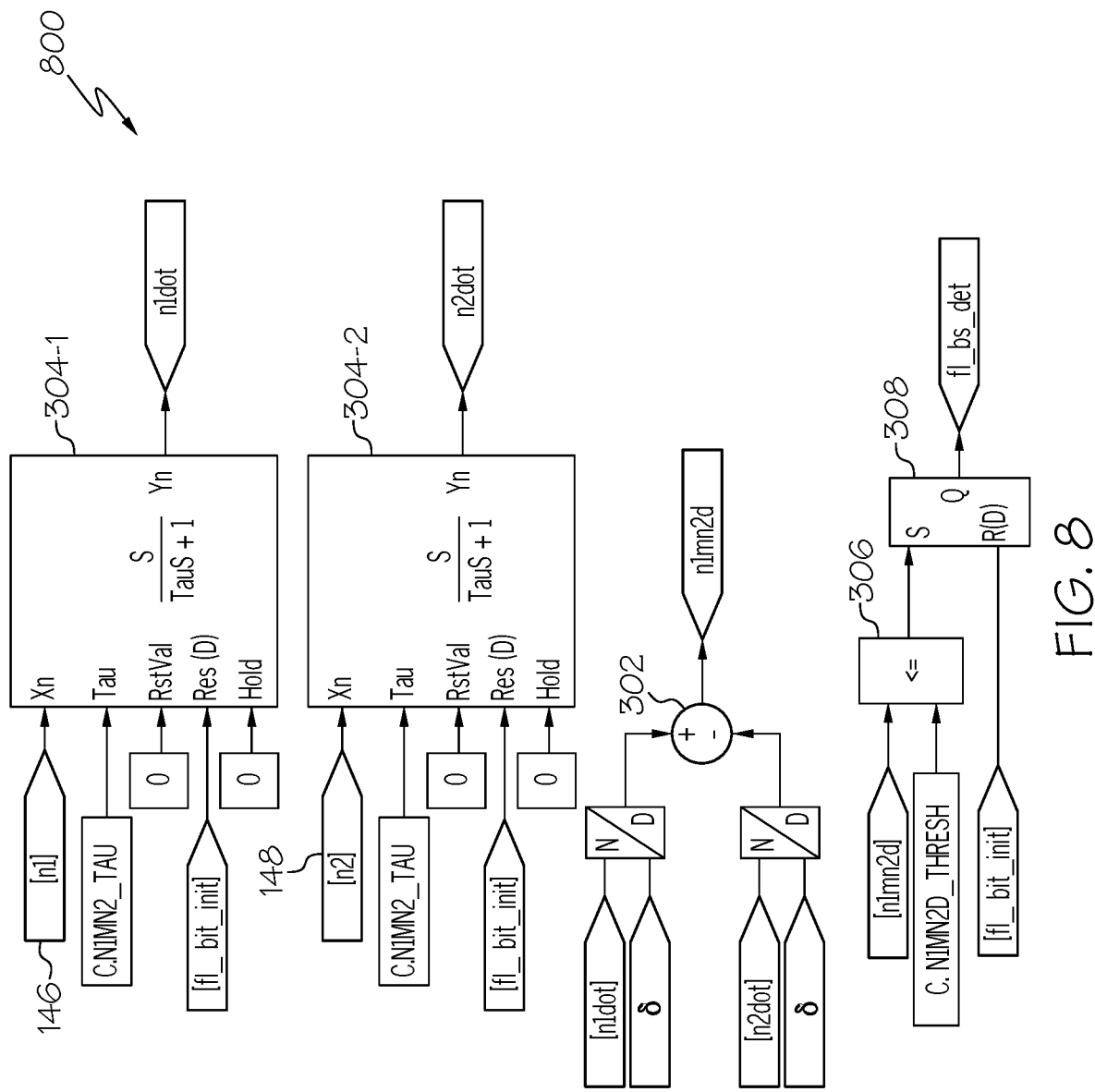

In still another embodiment, which is depicted in FIG. 8, the fan rotational speed rate of change (n1*dot*) and the turbine engine rotational speed rate of change (n2*dot*) are each corrected for ambient conditions, such temperature and/or pressure. This is accomplished by applying what are generally referred to as the theta correction (θ-correction) and/or the delta correction (δ-correction). As is generally known, the θ-correction is an ambient temperature correction factor (which is equal to [(Total Air Temperature/Tref] $^{1/2}$) where common values for Tref may include 518.7° R amongst others, and the δ-correction is an ambient pressure correction factor (which is equal to (Total Air Pressure/Pref), where common values for Pref may include 14.696 psia amongst others. In the embodiment depicted in FIG. 8, the depicted functional logic 800 is identical to the functional logic 700 depicted in FIG. 7, except that the fan rotational speed rate of change (n1*dot*) and the turbine engine rotational speed rate of change (n2*dot*) are each corrected for ambient pressure (i.e., δ-correction) before the difference function 302 determines the rate of change of the rotational speed difference (n1*mn2d*).

It will be appreciated that any of the functional logics 300-600 may be modified to implement θ-correction and/or δ-correction. For example, the functional logics 300-600 depicted in FIGS. 3-6 can be modified to correct (either θ-correction and/or δ-correction) the sensed fan rotational speed (n1) and the sensed turbine engine rotational speed (n2) before the difference function 302 determines the rotational speed difference (n1*mn2*). It will additionally be appreciated that in some embodiments the rate of change of the rotational speed difference (n1*mn2d*), the squared and filtered rate of change (n1*mn2d_pwf*), and/or the filtered and squared rate of change (n1*mn2d_fpw*) can be corrected (θ-correction and/or δ-correction).

Returning briefly to FIG. 1, in the depicted embodiment, total air temperature is supplied from one or more temperature sensors 152 (only one depicted), and total air pressure is supplied from one or more pressure sensors 154 (only one depicted).

The functional logics 300-800 depicted in FIGS. 3-8 and described above have been verified using previously acquired and stored severed shaft test data. The functional logics 300-800 have been verified using normal engine operation data associated with start, steady-state, acceleration, deceleration, and various maneuvers, and using various abnormal engine operating data. By implementing a relatively fast software sampling rate (e.g., 2-6 millisecond), a broken shaft can be detected in less than 0.04 seconds, which allows for proper engine shutdown.

The turbofan gas turbine engine shaft break detections system and method uses existing fan speed (N1) and turbine engine speed (N2) sensors and does not rely on additional hardware. The system and method implements a relatively short sample rate detection loop, which eliminates the unreliability associated with currently known sensors. The system and method also provide various other advantages, such as, for example, reducing engine recurring costs associated with presently known detector assemblies, mounting hardware, and associated wiring; reducing engine weight; reducing maintenance costs; simplifying engine control system design (fault detection, signal selection and accommodation); and improving overall system reliability.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for detecting a shaft break in a turbofan gas turbine engine, the turbofan engine including at least a fan and a turbine, the method comprising the steps of:
   sensing fan rotational speed;
   sensing turbine engine rotational speed;
   determining, in a processor, a rate of change of rotational speed difference between the sensed fan rotational speed and the sensed turbine engine rotational speed; and
   determining, in the processor, that a shaft break has occurred based at least in part on the rate of change of the rotational speed difference.

2. The method of claim 1, wherein the step of determining the rate of change of rotational speed difference comprises:
   subtracting, in the processor, the sensed turbine engine rotational speed from the sensed fan rotational speed to determine a rotational speed difference; and
   determining, in the processor, the rate of change of rotational speed difference.

3. The method of claim 2, wherein the step of determining that a shaft break has occurred comprises:
   comparing the rate of change of rotational speed difference to a predetermined threshold value; and
   determining that the shaft break has occurred if the rate of change of rotational speed difference is less than or equal to the predetermined threshold value.

4. The method of claim 2, wherein the step of determining the rate of change of rotational speed difference comprises filtering the rotational speed difference through a first-order high-pass filter.

5. The method of claim 1, wherein the step of determining that a shaft break has occurred comprises:
   calculating a square of the rate of change of rotational speed difference;
   filtering the square of the rate of change of rotational speed difference through a first-order lag filter to provide a squared and filtered rate of change;
   comparing the squared and filtered rate of change to a predetermined threshold value; and
   determining that the shaft break has occurred if the squared and filtered rate of change is greater than or equal to the predetermined threshold value.

6. The method of claim 1, wherein the step of determining that a shaft break has occurred comprises:
   filtering the rate of change of rotational speed difference through a first-order lag filter to provide a filtered rate of change;
   calculating a square of the filtered rate of change to provide a filtered and squared rate of change;
   comparing the filtered and squared rate of change to a predetermined threshold value; and
   determining that the shaft break has occurred if the filtered and squared rate of change is greater than or equal to the predetermined threshold value.

7. The method of claim 1, wherein the step of determining that a shaft break has occurred comprises:
   calculating a square of the rate of change of rotational speed difference;
   filtering the square of the rate of change of rotational speed difference through a first first-order lag filter to provide a squared and filtered rate of change;
   filtering the rate of change of rotational speed difference through a second first-order lag filter to provide a filtered rate of change;
   calculating a square of the filtered rate of change to provide a filtered and squared rate of change;
   subtracting the filtered and squared rate of change from the squared and filtered rate of change to provide a variance value;
   comparing the variance value to a predetermined threshold value; and determining that the shaft break has occurred if the variance value is greater than or equal to the predetermined threshold value.

8. The method of claim 1, further comprising:
correcting sensed fan rotational speed and the sensed turbine engine rotational speed for at least one of temperature and pressure.

9. The method of claim 1, wherein the step of determining the rate of change of rotational speed difference comprises:
determining, in the processor, fan rotational speed rate of change;
determining, in the processor, turbine engine rotational speed rate of change; and
subtracting, in the processor, the turbine engine rotational speed rate of change from the fan rotational speed rate of change.

10. The method of claim 9, further comprising:
correcting the fan rotational speed rate of change and the turbine engine rotational speed rate of change for at least one of temperature and pressure.

11. A turbofan gas turbine engine shaft break detection system for a turbofan engine that includes at least a fan and a turbine, the system comprising:
a fan rotational speed sensor configured to sense fan rotational speed and supply a fan rotational speed signal representative thereof;
a turbine engine rotational engine speed sensor configured to sense turbine engine rotational speed and supply a turbine engine rotational speed signal representative thereof;
a processor coupled to receive the fan rotational speed signal and the turbine engine rotational speed signal and configured, upon receipt thereof, to:
determine a rate of change of rotational speed difference between the sensed fan rotational speed and the sensed turbine engine rotational speed; and
determine that a shaft break has occurred based at least in part on the rate of change of the rotational speed difference.

12. The system of claim 11, wherein the processor is configured to determine the rate of change of rotational speed difference by:
subtracting, in the processor, the sensed turbine engine rotational speed from the sensed fan rotational speed to determine a rotational speed difference; and
determining, in the processor, the rate of change of rotational speed difference.

13. The system of claim 12, wherein the processor is configured to determine that a shaft break has occurred by:
comparing the rate of change of rotational speed difference to a predetermined threshold value; and
determining that the shaft break has occurred if the rate of change of rotational speed difference is less than or equal to the predetermined threshold value.

14. The system of claim 12, wherein the processor is configured to determine the rate of change of rotational speed difference by filtering the rotational speed difference through a first-order high-pass filter.

15. The system of claim 11, wherein the processor is configured to determine that a shaft break has occurred by:
calculating a square of the rate of change of rotational speed difference;
filtering the square of the rate of change of rotational speed difference through a first-order lag filter to provide a squared and filtered rate of change;
comparing the squared and filtered rate of change to a predetermined threshold value; and
determining that the shaft break has occurred if the squared and filtered rate of change is greater than or equal to the predetermined threshold value.

16. The system of claim 11, wherein the processor is configured to determine that a shaft break has occurred by:
filtering the rate of change of rotational speed difference through a first-order lag filter to provide a filtered rate of change;
calculating a square of the filtered rate of change to provide a filtered and squared rate of change;
comparing the filtered and squared rate of change to a predetermined threshold value; and
determining that the shaft break has occurred if the filtered and squared rate of change is greater than or equal to the predetermined threshold value.

17. The system of claim 11, wherein the processor is configured to determine that a shaft break has occurred by:
calculating a square of the rate of change of rotational speed difference;
filtering the square of the rate of change of rotational speed difference through a first first-order lag filter to provide a squared and filtered rate of change;
filtering the rate of change of rotational speed difference through a second first-order lag filter to provide a filtered rate of change;
calculating a square of the filtered rate of change to provide a filtered and squared rate of change;
subtracting the filtered and squared rate of change from the squared and filtered rate of change to provide a variance value;
comparing the variance value to a predetermined threshold value; and
determining that the shaft break has occurred if the variance value is greater than or equal to the predetermined threshold value.

18. The system of claim 11, wherein the processor is further configured to correct sensed fan rotational speed and the sensed turbine engine rotational speed for at least one of temperature and pressure.

19. The system of claim 11, wherein the processor is configured to determine the rate of change of rotational speed difference by:
determining, in the processor, fan rotational speed rate of change;
determining, in the processor, turbine engine rotational speed rate of change; and
subtracting, in the processor, the turbine engine rotational speed rate of change from the fan rotational speed rate of change.

20. The system of claim 19, wherein the processor is further configured to correct the fan rotational speed rate of change and the turbine engine rotational speed rate of change for at least one of temperature and pressure.

* * * * *